(12) United States Patent
Gilbert et al.

(10) Patent No.: US 7,765,531 B2
(45) Date of Patent: Jul. 27, 2010

(54) SYSTEMS AND METHODS FOR HANDLING MULTIPLE STATIC QUERY MODULES FOR DISTINCT ENVIRONMENTS

(75) Inventors: Gary Martin Gilbert, Arlington Heights, IL (US); Hansjorg Zeller, Los Altos, CA (US); Robert Matthew Wehrmeister, Austin, TX (US); Thomas Canivel Reyes, Austin, TX (US); Anoop Sharma, San Jose, CA (US); David Wayne Birdsall, Santa Clara, CA (US); Michael James Hanlon, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1373 days.

(21) Appl. No.: 10/960,708

(22) Filed: Oct. 6, 2004

(65) Prior Publication Data

US 2006/0074635 A1    Apr. 6, 2006

(51) Int. Cl.
*G06F 9/45* (2006.01)
(52) U.S. Cl. .................................. 717/141; 717/143
(58) Field of Classification Search .................. 717/141, 717/143; 707/4
See application file for complete search history.

(56) References Cited

U.S. PATENT DOCUMENTS

| 5,129,086 | A | * | 7/1992 | Coyle et al. | 707/3 |
| 5,230,049 | A | * | 7/1993 | Chang et al. | 717/143 |
| 5,504,885 | A | * | 4/1996 | Alashqur | 717/141 |
| 5,875,334 | A | * | 2/1999 | Chow et al. | 717/141 |
| 6,321,235 | B1 | * | 11/2001 | Bird | 707/203 |
| 6,378,126 | B2 | * | 4/2002 | Tang | 717/143 |
| 6,418,555 | B2 | * | 7/2002 | Mohammed | 717/169 |
| 6,968,335 | B2 | * | 11/2005 | Bayliss et al. | 707/10 |

OTHER PUBLICATIONS

Grechanik, et al. "An Approach to Evolving Database Dependent Systems", 2002, ACM, p. 113-116.*
Kiernan, et al. "Extending SQL-92 for OODB Access: Design and Implementation Experience", 1995, ACM, p. 467-480.*

* cited by examiner

*Primary Examiner*—Wei Y Zhen
*Assistant Examiner*—Qamrun Nahar

(57) ABSTRACT

Systems and methods to indicate whether to store a database query language module in a local directory or a global directory are disclosed. An application program can be created once, tested once, and deployed in separate environments. The database query language modules can be shared among a group of application programs running in a common environment. Separate query language modules can be maintained for each environment.

20 Claims, 3 Drawing Sheets

SYSTEMS AND METHODS FOR HANDLING MULTIPLE STATIC QUERY MODULES FOR DISTINCT ENVIRONMENTS

BACKGROUND

Database language Structured Query Language (SQL) is a language used to enter and retrieve information from a SQL database. SQL can be embedded in application source code, but it is not a programming language. To write a program that accesses a database, a developer starts with a conventional programming language, such as COBOL, PL/I, FORTRAN, C, or Pascal and embeds SQL statements directly into the program's source code, intermixed with the other programming language statements. Certain SQL statements are used to retrieve data into the program. A SQL pre-compiler accepts the combined source code and separates the SQL statements from the conventional programming language statements.

Executable modules for application programs may be run in separate environments on a single system. For example, quality assurance, performance test, parallel test, and multiple versions of an application executable may be required by different developers on a single system. SQL modules are stored in a fixed location, thus complicating development and deployment issues when multiple environments are present.

Developers compile application code once for post development environments. After an application program has been released, tested, and accepted there is no provision to allow the source code to be pre-processed or language compiled. To pre-process or language compile a program subsequent to acceptance would be contrary to standard release practices.

SUMMARY

In some embodiments, systems and methods to indicate whether to store a database query language module in a local directory or a global directory are disclosed. An application program can be created once, tested once, and deployed in separate environments. The database query language modules can be shared among a group of application programs running in a common environment. Separate query language modules can be maintained for each environment.

BRIEF DESCRIPTION OF THE DRAWINGS

The accompanying drawings, which are incorporated in and form a part of this specification, illustrate embodiments of the invention and, together with the description, serve to explain its principles.

DETAILED DESCRIPTION OF THE DRAWINGS

Developers often maintain multiple environments on production and development computer systems. Embodiments described in this disclosure allow an application program to be created once, tested once, and deployed in separate environments. The database query language modules can be shared among a group of application programs running in a common environment. Separate query language modules can be maintained for each environment.

Figure 1:
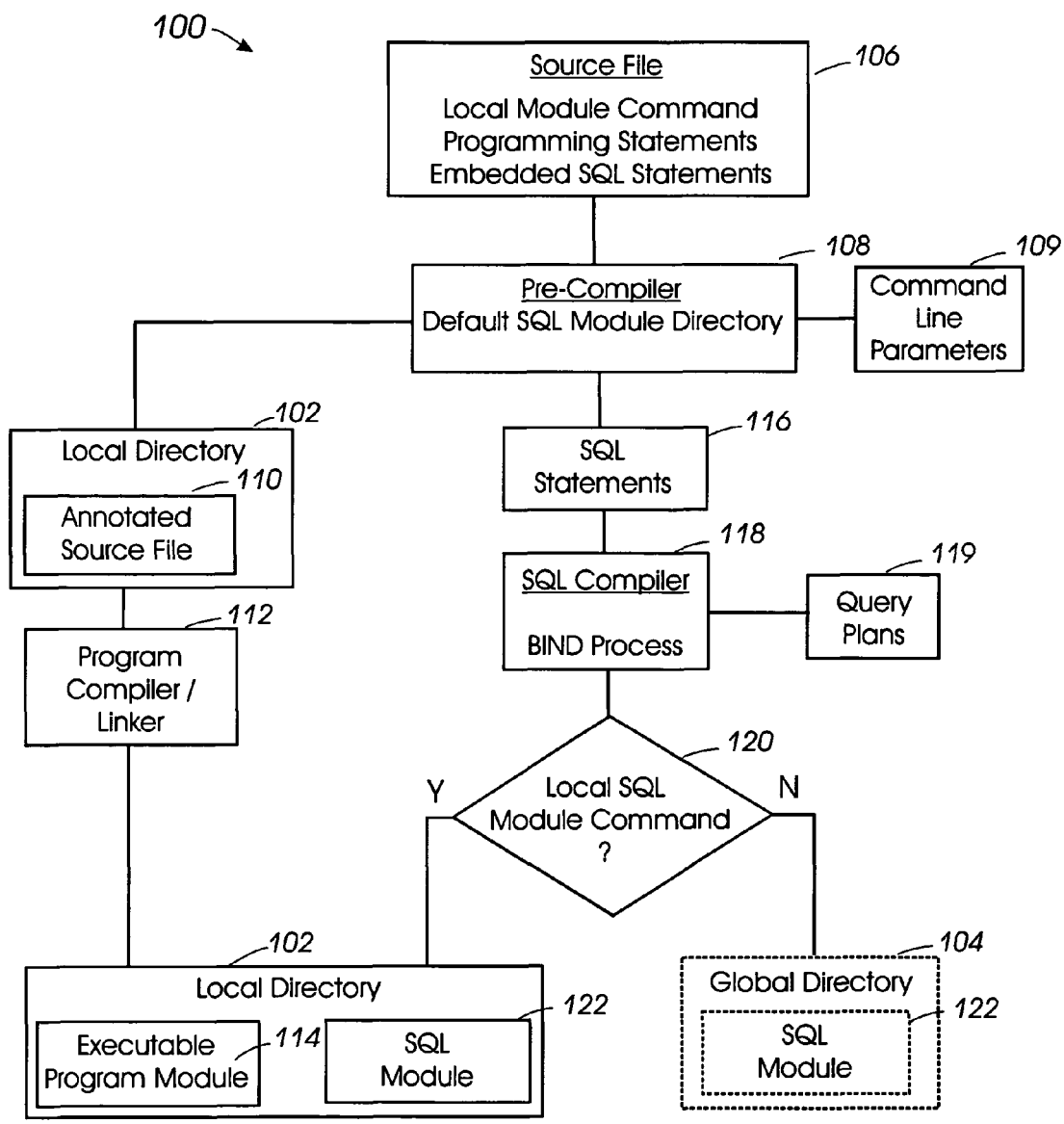
FIG. 1 is a flow diagram of an embodiment of a process for determining whether to store a database query language module in a local directory or a global directory.

FIG. 1 shows a flow diagram of an embodiment of a process 100 for determining whether a query language module should be placed in a local directory 102 or a global directory 104. Source file 106 includes programming language statements, and query language statements embedded among the programming language statements. Source file 106 also includes an indicator, such as a command line, that indicates whether the query language module should be placed in local directory 102 or global directory 104.

Note that the American National Standards Institute (ANSI) database language Structured Query Language (SQL) is used as an example of a query language and database management system (DBMS) that can be utilized to implement the systems and processes disclosed herein. Any suitable query language can be utilized in addition to, or instead of, SQL, however.

Pre-compiler 108 scans source file 106 for the embedded SQL statements and parses the SQL statements from programming statements. A different pre-compiler 108 is typically required for each programming language supported by the DBMS. SQL pre-compilers 108 are typically offered commercially for one or more languages, including C, Pascal, COBOL, FORTRAN, Ada, PL/I, RPG, and various assembly languages. Various options can be selected by specifying one or more command line parameters 109 when pre-compiler 108 is invoked.

Pre-compiler 108 produces two files from source file 106. The first file is annotated source file 110, which includes the programming statements without the embedded SQL statements. In place of the SQL statements, pre-compiler 108 substitutes calls to "private" DBMS routines. Annotated source file 110 is input to program compiler and linker 112 to build a computer-executable program module 114. Compiler/linker 112 processes the source code to produce object code and links the object code with various library routines to produce executable program module 114. Multiple object codes may be combined into a single executable program module 114. The library routines linked into executable program module 114 include the private DBMS routines, which associate program module 114 with the DBMS at run-time.

The second file generated by pre-compiler 108, shown as SQL statements file 116, includes a copy of the embedded SQL statements from source file 106. SQL statements file 116 is sometimes referred to as a database request module (DBRM). The database request module generated by pre-compiler 108 is submitted to SQL compiler 118, which can also include a BIND process to associate a query plan 119 with a corresponding executable program module 114 and SQL module 122.

SQL compiler 118 can examine, parse, validate, and optimize SQL statements 116, and produce a query plan 119 for each SQL statement 116. SQL compiler 118 can also produce an executable SQL module 122 that is stored in a file. SQL modules 122 can be accessed by executable program modules 114, and include instructions for viewing and accessing database tables. Process 120 determines whether source file 106 includes an indicator, such as a command line or statement, indicating whether the SQL module 122 should be stored in local directory 102 or global directory 104. Query plans 119 can be placed in SQL module 122.

SQL modules 122 in global directory 104 can potentially be shared by all executable program modules 114 that use SQL. An independently compiled source file may be linked into one or more executable program modules 114. Multiple compiled programs may be linked into a given executable program module 114. Thus, an executable program module 114 may refer to multiple SQL modules 122. All program modules 114 would share corresponding SQL modules 122 with other executables that linked in the same independently compiled source file. A copy may be made of a program module 114, and the copy is treated identically to a program module 114 that linked with the identical set of independently compiled source file. Therefore a copy of a program module 114 shares the corresponding SQL modules 122. Previously known systems only allowed SQL modules 122 to be stored in a single location, such as global directory 104, or other suitable location or file structure. In other systems, SQL modules 122 were replicated and stored inside each executable program module 114.

SQL modules 122 in local directory 102 are semi-private and can potentially be shared by all executable program modules 114 that use SQL where program modules 114 are stored in the same local directory 102. All program modules 114 that link with an independently compiled source file and stored in the same local directory 102 share SQL modules 122 in local directory 102. Program modules 114 stored in other local directories 102 use corresponding semi-private SQL modules 122 in the particular local directory 102. After creating program modules 114, the developer may copy or share the program modules 114 with others as required by a specific product life cycle.

The format or contents of a SQL module 122 does not depend on whether it is placed in the local directory 102 or if it is placed in the global directory 104, thus allowing SQL modules 122 in the local directory 102 to be moved or copied to the global directory 104, and vice-versa. Program modules 114 that use more than one SQL module 122 may use a combination of SQL modules 122 in local directory 102 and global directory 104.

Developers can place a command line parameters in command line parameters file 109 to indicate whether SQL module 122 should be placed in local directory 102 or global directory 104. The command line can be detected as a SQL statement 116 by pre-compiler 108, and/or by SQL compiler 118. In some embodiments, SQL compiler 118 places SQL module 122 in global directory 104 by default unless instructed to place SQL module 122 in local directory 102. Such an implementation ensures compatibility with current environments and alleviates any impact on developers that do not wish to use SQL modules 122 in local directories 102. Developers who wish to use SQL modules 122 in local directory 102 by default may set a default parameter for pre-compiler 108 or SQL compiler 118 to produce SQL modules 122 in local directory 102. In some embodiments the command:

-g moduleglobal can be placed in command line parameters file 109 to indicate that SQL module 122 should be placed in global directory 104. The option to use global directory 104 can be set as an input parameter for pre-compiler 108 or SQL compiler 118.

Alternatively, the command:

-g moduleLocal [=<directory>]

can be placed in command line parameters 109 to indicate that SQL module 122 should be placed in local directory 102. The location of local directory 102 can be supplied as a <directory> parameter in the command by the developer. If the directory parameter is not specified, SQL module 122 can be created in the current directory. If the specified directory does not exist, an error message can be generated by compiler 118. SQL module 122 can either not be produced, or SQL module 122 can be placed in a temporary directory and a message sent to the developer providing the location. The developer can then move the SQL module 122 to the desired directory.

A default command can be used to provide a default location if none of the -g options are specified. An ON/OFF parameter can be set to ON to indicate whether SQL module 122 is placed in local directory 102 or OFF to indicate global directory 104. A -g command line option can take precedence over the default value stored in a Defaults table for SQL compiler 118. Any Control Query Default (CQD) contained in command line parameters file 109 can take precedence over a command line option or a default value stored in the Defaults table. If the CQD appears multiple times in command line parameters file 109, then the last CQD overrides all previous CQD in source text order.

SQL modules 122 can be moved between global directory 104 and local directory 102. Replacing an SQL module 122 in local directory 102 with a SQL module 122 in global directory 104 requires manual deletion of the SQL modules 122 in local directory 102. The existing SQL module 122 can be archived to provide a backup if the new SQL module 122 does not meet expectations. For example, an archived version of SQL module 122 can be used in situations where query plans 119 are still valid, or SQL module 122 was recompiled due to updated statistics, such updated as row counts, or the distribution of values in one or more columns in a table.

Alternately, a developer using SQL modules 122 in global directory 104 may first make copies of executable program module 114 in a new local directory 102 and subsequently compile new versions of SQL modules 122 in local directory 102. Such a procedure allows a developer to use a version of program module 114 using the new SQL modules 122 in local directory 102 concurrently with a version using existing SQL modules 122 in global directory 104. Other scenarios are possible as well to meet the requirements of other deployment strategies. For example, in a graphical user interface-based environment, such as Enterprise Tool Kit development environment by Hewlett-Packard Company, Palo Alto, Calif., the program modules 114 are generated on a developer's workstation. The source file 106 and program modules 114 are then deployed to the run-time environment, such as the NonStop Kernel environment by Hewlett-Packard Company of Palo Alto, Calif.

Query plan 119 is typically optimized for the database structure, as it exists at the time the plan 119 is placed in the database by the BIND process. If the structure changes later (for example, if an index is dropped or a column is deleted from a table), any query plan 119 that references the changed structures may become invalid. To handle this situation, the DBMS usually stores, along with query plan 119, a copy of the original SQL statements 116 from which query plans 119 were produced. The DBMS also keeps track of all database objects upon which each query plan 119 depends. If any of these objects are modified by a Data Definition Language (DDL) statement, the DBMS can find the plans 119 that depend on it and automatically marks modified query plans 119 as invalid. DDL statements can also be used to change the authorization to use SQL module 122. The next time program module 114 tries to use query plan 119, the DBMS can automatically rebind the SQL statements 116 to produce a new query plan 119. Although the DBMS can automatically rebind query plan 119 when one of the structures upon which it depends is changed, the DBMS cannot automatically detect changes in the database that may make a better plan 119 possible. To take advantage of a new structure the BIND process must be explicitly invoked to rebind the plan 119.

Query plan 119 and SQL module 122 are used during run-time to execute the DBMS instructions for the executable program module 114. When program module 114 is invoked, a DBMS routine finds and loads the query plan 119 for program module 114. For each embedded SQL statement, program module 114 calls one or more private DBMS routines, requesting execution of the corresponding statement in the query plan 119. The DBMS finds the statement, executes the corresponding part of query plan 119, and then returns control to program module 114. Execution continues in this way, with program module 114 and DBMS cooperating to carry out the task defined by the original embedded SQL statements 116.

Figure 2:
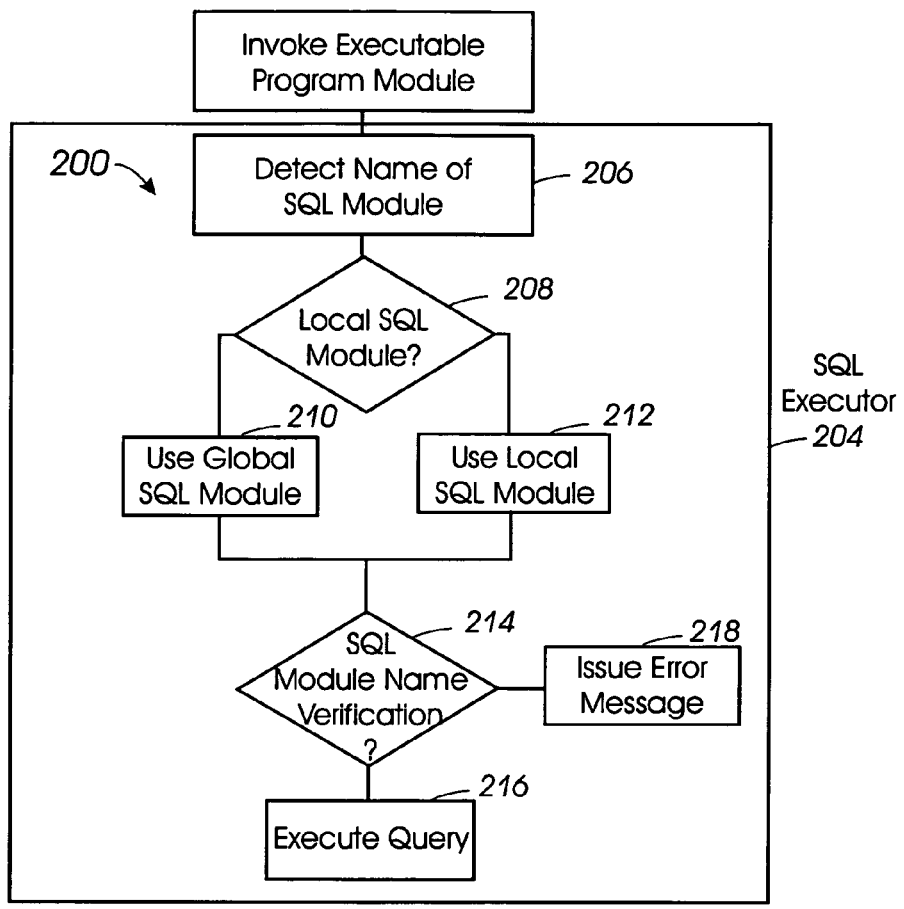
FIG. 2 is a flow diagram of an embodiment of a process for determining whether to access a database query language module in a local directory or a global directory are provided.

Referring to FIGS. 1 and 2, FIG. 2 shows an embodiment of a process 200 that can be performed when program module 114 is invoked. Sub-processes 206 through 218 can be implemented in the run-time component of the SQL DBMS, which is referred to as SQL Executor 204. Executor 204 reads query plans 119 for SQL module 122 and the name of SQL module 122 in sub-process 206. Sub-process 208 determines whether SQL module 122 is stored in the same local directory 102 as the executable program module 114 that invoked executor 204. If not, then sub-process 210 invokes SQL module 122 in global directory 104. Otherwise, SQL module 122 in local directory 102 is used, as indicated by sub-process 212. SQL executor 204 can enforce security based on a user-id supplied by the developer executing the program module 114, a user-id for the corresponding SQL module 122, or other suitable security or authorization feature.

Sub-process 214 verifies that the name of the SQL module 122 invoked by program module 114 matches the name of the SQL module 122 in local directory 102 or global directory 104. If the name of SQL module 122 is verified, sub-process 216 executes query plan 119. Otherwise, an error message can be issued to inform the developer of the mismatch in sub-process 218.

Figure 3:
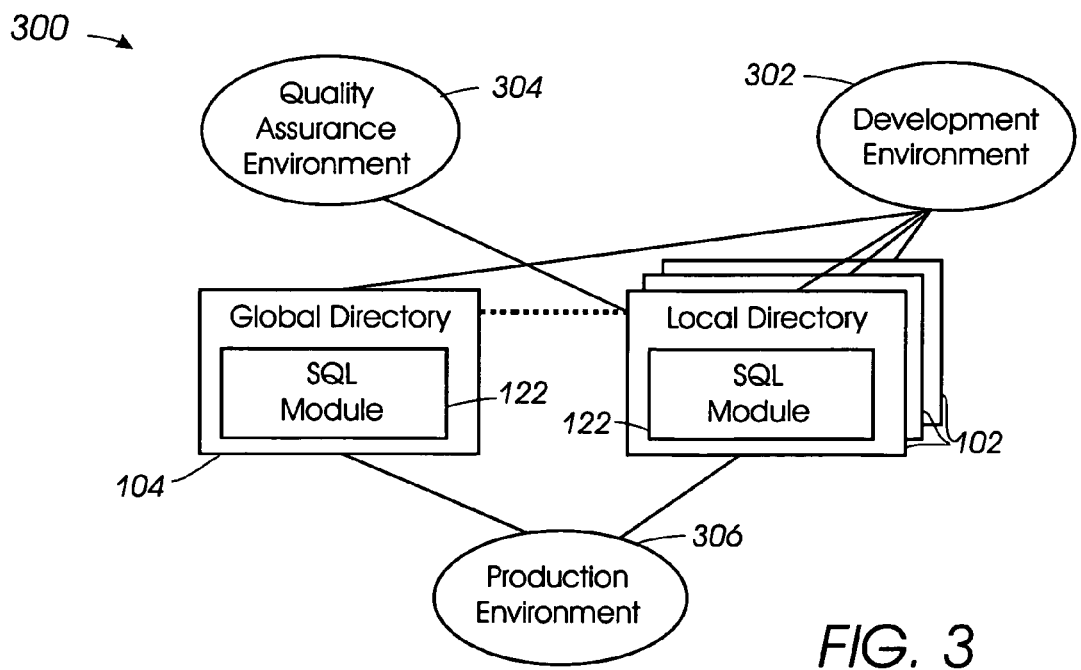
FIG. 3 is a diagram showing query language modules in a global directory and a local directory that can be accessed by application programs in different environments.

Referring to FIGS. 1 and 3, FIG. 3 shows that program modules 122 can be developed in development environment 302, tested or certified in quality assurance environment 304, and then deployed to production environment 306. Common quality assurance auditing requirements can be met without requiring testing and certification in each environment. Database tables in each environment can have different or the same names whereas prior solutions required the tables in each environment to have the same name. Additionally, the environments can be managed as if they were a single environment, alleviating the need to pre-process and re-compile SQL module 122 for each separate environment where the resulting executable program module 114 is used. Further, there is no need to perform functional testing and certification multiple times because program module 114 does not need to be re-compiled several times before deployment to production environment 306. Additionally, developers in production environment 306 can select between SQL modules 122 in global directory 104 or local directory 102.

Additionally, the attributes of each object in the database can differ in each environment. For example a table in one environment may have different indexes than a table in a second environment. An SQL feature referred to as late-name resolution allows the table names in each environment to differ as well. In contrast, prior systems required database objects to be named identically in each environment and attributes of each object to be consistent in each environment.

Figure 4:
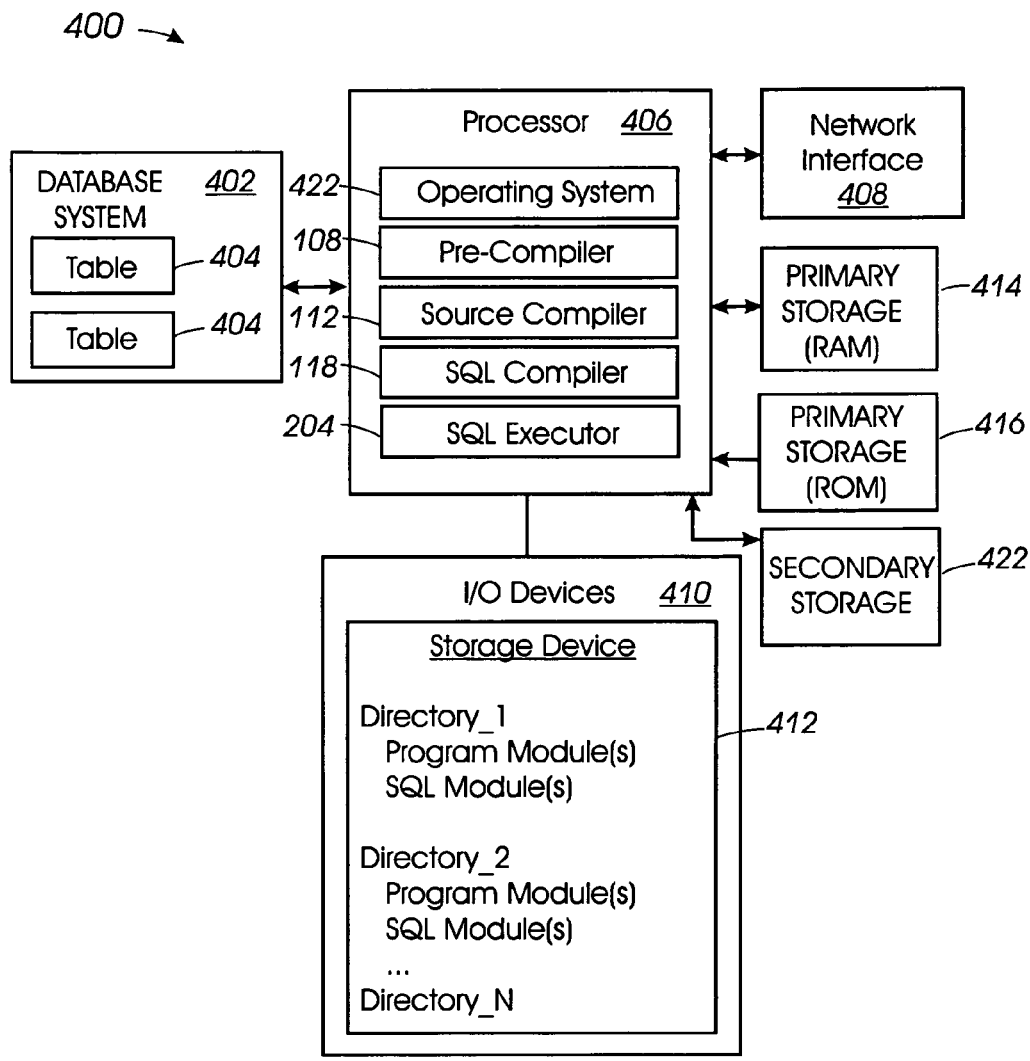
FIG. 4 is a diagram of an embodiment of a computer system in which logic instructions can be implemented to perform processes associated with storing query language modules in local directories and global directories.

Referring to FIGS. 1 and 4, FIG. 4 shows a diagram of an embodiment of a computer system 400 that is a suitable platform for supporting a database system 402. Database system 402 includes one or more relational database tables 404. Each table 404 includes a series of rows. Computer system 400 includes one or more processors 406. Multiple processors 406 can be coupled to communicate with one another in a local or wide-area network via network interface 408.

Computer system 400 may be implemented in a variety of configurations such as servers, personal computers, hand-held devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices that are linked through network interface 408. Processor 406 can also be coupled to input/output devices 410 that may include, but are not limited to, mass storage devices 412, video monitors, track balls, mice, keyboards, microphones, touch-sensitive displays, transducer card readers, magnetic or paper tape readers, tablets, styluses, voice or handwriting recognition systems, and/or other suitable types of devices.

In a distributed computing environment, program modules 114 and SQL modules 122 may be located in both local and remote storage devices 412. Additionally, some embodiments may be implemented as logic instructions and distributed on computer readable media or via electronic signals.

Processor 406 can be a special-purpose device designed specifically to interface with database system 402. In such embodiments, processor 406 can be coupled to communicate with a central processing unit (not shown) that performs other functions and coordinates activities of associated processors, such as processor 406.

Computer system 400 can include any number of memory devices including primary storage devices 414, 416 such as a random access memory (RAM), and read only memory (ROM). ROM acts to transfer data and instructions uni-directionally to processor 406, while RAM is used typically to transfer data and instructions in a bi-directional manner.

System 400 can also include a secondary storage device 422 coupled for bi-directional communication with processor 406. Secondary storage device 422 typically includes a storage medium with slower read/write access than RAM or ROM. Examples of mass memory devices such as hard disk drives or a tape. Information retained within secondary storage device 422, may, in appropriate cases, be incorporated as part of RAM 418 as virtual memory.

Processor 406 can execute logic instructions implemented in hardware, software, and/or firmware. Such instructions can include operating system 422, pre-compiler 108, source compiler 112, SQL compiler 118, and SQL executor 204. Program modules 114 and SQL modules 122 can also be loaded into primary storage 414 when invoked. Operating system 422 controls operation of processor 406 and interfaces with network interface 408, primary storage 414, 416, I/O devices 410, and database system 402.

Process 100 provides the developer with complete control over the placement of original source file 106, annotated source file 110, the object file(s) generated by compiler/linker 112, executable program module 114, SQL statements 116, and SQL module 122. Program module 114 and SQL module 122 can either be stored in a common global directory 104 or in the same local directory 102 where program module 114 is stored. Additionally, multiple versions of a program module 114 can be placed in the different directories with corresponding versions of SQL modules 122.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. An apparatus comprising:
   logic instructions embedded on non-transitory computer readable medium operable to:
      pre-compile a source code file, wherein the source file includes database query language statements embedded in programming language statements;
      generate a query language module based on the query language statements; and
      detect a command line that indicates whether the query language module should be stored in a local directory or a global directory, wherein executable program modules that use more than one query language module can use a combination of query language modules in local directory and global directory.

2. The apparatus of claim 1, further comprising:
   logic instructions embedded on computer readable medium operable to:
      search the local directory for the query language module; and
      search the global directory for the query language module.

3. The apparatus of claim 1, further comprising:
   logic instructions embedded on computer readable medium operable to:
      verify identity of the query language module.

4. The apparatus of claim 1, further comprising:
   a data element that specifies a default directory for the query language module.

5. The apparatus of claim 1, further comprising:
   logic instructions embedded on computer readable medium operable to perform at least one of the group consisting of:
      move the query language module from one location to another; copy the query language module; restore the query language module; remove the query language module; create the query language module; archive the query language module; and assign an alias name for the query language module.

6. The apparatus of claim 1, further comprising:
   logic instructions embedded on computer readable medium operable to:
      compile and link the programming language statements to generate an executable program module, wherein the executable program module and the query language module reside in the local directory.

7. The apparatus of claim 1, further comprising:
   a processor configured to execute the logic instructions.

8. The apparatus of claim 1, wherein the command line is included in the source code file.

9. A method comprising: pre-compile a source code file, wherein the source file includes database query language statements embedded in programming language statements;
   generate a query language module based on the query language statements;
   segregating the query language statements from the programming language statements in the source file; and
   using an indicator in a command line parameter file to determine whether to store the query language module in a local directory or a global directory, the query language module is based on the query language statements, wherein executable program modules that use more than one query language module can use a combination of query language modules in local directory and global directory.

10. The method of claim 9, further comprising:
    compiling the query language statements to generate the query language module.

11. The method of claim 10, further comprising:
    detecting a name of the query language module when the query language module is invoked; and
    verifying that the name of the invoked query language module matches the name of the query language module.

12. The method of claim 11, further comprising:
    issuing an error indicator when the name of the invoked query language module does not match the name of the query language module.

13. The method of claim 9, further comprising:
    determining whether the query language module is in the local directory when an application program invokes the query language module.

14. The method of claim 9, further comprising:
    determining whether the query language module is in the global directory when the query language module is not found in the local directory.

15. The method of claim 9, wherein the query language module in the local directory is accessible by any application program in the local directory.

16. The method of claim 9, wherein the query language module in the global directory is accessible by an application program in the local directory.

17. An apparatus comprising: means for pre-compiling a source code file, wherein the source file includes database query language statements embedded in programming language statements;
    means for generating a query language module based on the query language statements;
    means for detecting an indicator of whether to store the database query language module in a local directory or a global directory, wherein the indicator is included in the source code file ; and means for storing the query language module in the local directory or the global directory based on the indicator, wherein executable program modules that use more than one query language module can use a combination of query language modules in local directory and global directory.

18. The apparatus of claim 17, further comprising:
means for separating query language statements from programming language statements in the source code file, wherein the query language module is based on the query language statements.

19. The apparatus of claim 17, further comprising:
means for determining whether the query language module is in the local directory when an application program invokes the query language module; and
means for determining whether the query language module is in the global directory when the query language module is not found in the local directory.

20. The apparatus of claim 17, wherein the query language module is a Structured Query Language (SQL) module.

* * * * *

UNITED STATES PATENT AND TRADEMARK OFFICE
CERTIFICATE OF CORRECTION

| | | |
|---|---|---|
| PATENT NO. | : 7,765,531 B2 | Page 1 of 1 |
| APPLICATION NO. | : 10/960708 | |
| DATED | : July 27, 2010 | |
| INVENTOR(S) | : Gary Martin Gilbert et al. | |

It is certified that error appears in the above-identified patent and that said Letters Patent is hereby corrected as shown below:

In column 8, line 65, in Claim 17, before "query" delete "database".

Signed and Sealed this
Twenty-fifth Day of January, 2011

David J. Kappos
*Director of the United States Patent and Trademark Office*